United States Statutory Invention Registration [19]

McDaniel et al.

[11] Reg. Number: H625

[43] Published: Apr. 4, 1989

[54] GROUT FORMULATION FOR DISPOSAL OF LOW-LEVEL AND HAZARDOUS WASTE STREAMS CONTAINING FLUORIDE

[75] Inventors: Earl W. McDaniel; Terry L. Sams; Othar K. Tallent, all of Oak Ridge, Tenn.

[73] Assignee: The United States of America as represented by the United States Department of Energy, Washington, D.C.

[21] Appl. No.: 56,833

[22] Filed: Jun. 2, 1987

[51] Int. Cl.[4] ..... G21F 9/16; C04B 7/02; C04B 2/02; C04B 7/34

[52] U.S. Cl. ..... 252/628; 106/89; 106/97; 106/118

[58] Field of Search ..... 106/85, 89, 97, 118, 106/120; 252/628, 629

[56] References Cited

U.S. PATENT DOCUMENTS

| | | | |
|---|---|---|---|
| 4,042,408 | 8/1977 | Murray et al. | 106/100 |
| 4,054,460 | 10/1977 | Buchet et al. | 106/89 |
| 4,083,730 | 4/1978 | Kwech et al. | 106/100 |
| 4,089,695 | 5/1978 | Ray | 106/89 |
| 4,135,941 | 1/1979 | Skalny et al. | 106/100 |
| 4,452,637 | 6/1984 | Suzukawa et al. | 106/89 |

OTHER PUBLICATIONS

Radioactive Waste Technology, the American Society of Mechanical Engineers, New York, 1986, Chapter 8 (pp. 317–330, 347–349.)

Stinton, D. P., et al., "Characterization of Hydrofracture Grouts for Radionuclide Migration", Oakridge National Laboratory, Jul. '83.

Struxness, E. G., et al., "Engineering Development of Hydraulic Fracturing as a Method for Permanent Disposal of Radioactive Wastes", Oakridge National Laboratory, Aug. 9, 1968.

Moore, J. G., et al., "Strontium Leachability of Hydrofracture Grouts for Sludge–Slurries", Oakridge National Laboratory, May '86.

Moore, J. G., "Development of Cementitious Grouts for the Incorporation of Radioactive Wastes, Part I: Leach Studies", Oakridge National Laboratory, Apr. 1975.

Moore, J. G., "Development of Cementitious Grouts for the Incorporation of Radioactive Wastes, Part II: Continuation of Cesium and Strontium Leach Studies", Oakridge National Laboratory, Sep. 1976.

Tallent, O. K. et al., "Fixation of Waste Materials in Grouts, Part I: Empirical Correlations of Formulation Data", Oakridge National Laboratory, publication No. TM-9680/PI, Mar. 1986.

American Society for Testing and Materials 1984 Annual Book of ASTM Standards, vol. 04.01, publication C305-82, "Standard Method for Mechanical Mixing of Hydraulic Cement Pastes and Mortars of Plastic Consistency", pp. 255–258.

American Society for Testing and Materials, 1984 Annual Book of ASTM Standards, vol. 04.02, publication C192081, "Standard Methods of Making and Curing Concrete Test Specimens in the Laboratory", pp. 141–150.

*Primary Examiner*—John F. Terapane

*Attorney, Agent, or Firm*—Stephen D. Hamel; Judson R. Hightower

[57] ABSTRACT

A composition and related process for disposal of hazardous waste streams containing fluoride in cement-based materials is disclosed. The presence of fluoride in waste materials acts as a set retarder and as a result, prevents cement-based grouts from setting. This problem is overcome by the present invention wherein calcium hydroxide is incorporated into the dry-solid portion of the grout mix. The calcium hydroxide renders the fluoride insoluble, allowing the grout to set up and immobilize all hazardous constituents of concern.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GROUT FORMULATION FOR DISPOSAL OF LOW-LEVEL AND HAZARDOUS WASTE STREAMS CONTAINING FLUORIDE

FIELD OF THE INVENTION

The present invention relates to a method and composition for disposing of low-level and hazardous waste streams containing fluoride in cement-based materials. More particularly, the present invention relates to the incorporation of calcium hydroxide into grout formulations to inactivate fluorides present in hazardous and low-level waste streams.

BACKGROUND OF THE INVENTION

Fixation or immobilization of wastes in cement-based materials, commonly referred to as grouts, is an important waste management method. Formulations prepared by mixing the waste material with a dry-solid blend consisting of cement, fly ash and clays are commonly referred to as grouts. Grout properties of importance in waste immobilization variously include the rheologic properties of freshly mixed grouts, the structural stength of cured grouts, the leach properties of cured grouts and the amount of grout phase separation exhibited at various times during curing.

A problem which is encountered in waste disposal is the presence of fluorides in the waste materials. Fluoride acts as a set retarder for cement based grouts and therefore presents a serious problem for immobilization of waste containing fluoride.

Hydrofracture grouts are composed primarily of cementitious phases. Therefore, it is important to understand the reactions that occur during the hydration cement. These reactions are discussed in detail in Stinton, D. P., et al, *Characterization of Hydrofracture Grouts for Radionuclide Migration,* Oakridge National Laboratory, July 1983. This article shows that a significant amount of calcium hydroxide is generated as a result of the hydration of cementitious phases present in grout materials. In addition, this article also teaches that this calcium hydroxide, sometimes called Portlandite, apparently reacts with carbon dioxide from the air to form carbonates. This article does not address the problem created by fluoride in the waste material to be incorporated in the grout. Moreover, the amount of calcium hydroxide generated by hydration of the cementitious phases does not suffice to inactivate undesirable fluoride present in the waste material and, as a result, fluorides retard or prevent setting of the grout.

Struxness, E. G., et al, *Engineering Development of Hydraulic Fracturing as a Method for Permanent Disposal of Radioactive Wastes,* Oakridge National Laboratory, Aug. 9, 1968, discusses the initial development of formulations used as hydrofracture grouts. The primary problem addressed by this article is the leaching of radioactive strontium from the grout material. This article teaches that a significant amount of calcium is leached out of the grout material in addition to the salts normally present in the waste material. Presumably, this calcium came from soluble compounds formed in the cement as it set. The analytical data confirmed that the amount of radioactive strontium leached out of the grout material was directly proportional to the amount of calcium which leached from the grout. Accordingly, the article teaches that reduction of the amount of leachable calcium in the grout material is desirable since it will reduce the amount of radioactive strontium leached from the grout.

Additional research has been performed to develop the required cementitious grouts for disposal of low-level radioactive waste. The results of this research are embodied in the following articles: Moore, J. G., et al, *Strontium Leachability of Hydrofracture Grouts for Sludge-Slurries,* Oakridge National Laboratory, March 1982; Moore, J. G., *Development of Cementitious Grouts for the Incorporation of Radioactive Wastes. Part I: Leach Studies,* Oakridge National Laboratory, April 1975; and Moore, J. G., *Development of Cementitious Grouts for the Incorporation of Radioactive Wastes. Part II: Continuation of Cesium and Strontium Leach Studies,* Oakridge National Laboratory, September 1976. These articles deal with the adaptation of cementitious grouts for permanent immobilization of low-level radioactive wastes containing strontium and cesium. These reports recognize that reductions in the amount of cement in the grouts leads to a corresponding reduction in the amount of strontium which leaches out of the grout materials. This phenomenon is directly attributable to the reduction in the amount of leachable calcium present in the grout material as a result of the reduction in the amount of cement present in the material. These articles also found that the amount of strontium leaching out of the grout material could be reduced by addition of stable strontium in combination with calcium ions in the form of calcium chlorides.

Tallent, O. K. et al, *Fixation of Waste Materials in Grouts. Part I: Empirical Correlations of Formulation Data,* Oakridge National Laboratory, March 1986, explores the properties of cementitious materials used for disposal of waste materials. This publication addresses the variations in critical properties which occur as a result of variations in the composition of the dry-solid materials used to formulate the grout.

SUMMARY OF THE INVENTION

The present invention relates to a composition which is used to formulate a waste disposal grout that inactivates fluoride ions in the waste comprising from about 30 to about 70 weight percent cement; from about 10 to about 60 weight percent fly ash; from about 3 to about 13 weight percent clay; and from about 5 to about 20 weight percent calcium hydroxide.

In a second embodiment the present invention relates to a method for the immobilization of fluoride ion containing waste in cement based materials comprising the steps of mixing aqueous waste material containing fluoride ions with from about 6.0 to about 10.0 lbs of a dry-solid material per gallon of said waste material. The dry-solid material comprises from about 30 to about 70 weight percent cement; from about 10 to about 60 weight percent fly ash; from about 3 to about 13 weight percent clay; and from about 5 to about 20 weight percent calcium hydroxide. Finally, the mixture is cured to produce a solid cement-based material.

Accordingly, it is the primary object of the present invention to provide a method and composition for inactivating fluorides present in hazardous waste materials so that cement based grout can be used to immobilize such waste materials.

Another object of the present invention is to provide a dry-solid material for use in formulation of cement based grout that can immobilize fluoride-containing waste materials.

These and other objects of the present invention will be apparent to one of ordinary skill in the art from the detailed description which follows.

DETAILED DESCRIPTION OF THE PREFERRED EMBODIMENTS

The invention relates to a method and composition of matter wherein calcium hydroxide is added to cement-based waste disposal grout containing fluoride to render the fluoride insoluble. This allows the grout to set up to proper structural integrity for immobilization of all hazardous constituents of concern. This also substantially increases the rate of hydration of the cement thereby eliminating drainable water and producing an end product which exhibits properties favorable to delisting waste. The invention is applicable to the disposal of any aqueous waste material containing fluorides in cement-based grouts. Such waste materials include nuclear reactor cladding removal waste and waste generated by electroplating reactions.

In general, grout materials are formulated by preparing a dry-solid blend of cement, fly ash and clays and mixing this dry-solid blend with an aqueous waster material to obtain a cement-based material commonly referred to as grout. The methods of preparation of grout materials are discussed in more detail in Tallent, O. K. et al, *Fixation of Waste Materials in Grouts. Part I: Empirical Correlations of Formulation Data,* Oakridge National Laboratory, March 1986, which is hereby incorporated by reference. The grout materials are made by mixing the aqueous waste stream with the dry-solid blend in the manner set forth by the American Society for Testing and Materials in 1984 *Annual Book of ASTM Standards,* Volume 04.02, Publication C192-81, "Standard Method of Making and Curing Concrete Test Specimens in the Laboratory", and Volume 04.01, Publication C305-82, "Standard Method for Mechanical Mixing of Hydraulic Cement Pastes and Waters of Plastic Consistency", which are hereby incorporated by reference.

Aqueous waste streams containing fluoride ions may be disposed of in accordance with the present invention. The waste stream may also contain any of a number of other industrial waste materials such as strontium, cesium, nitrates, sulfates, hydroxides and other materials such as metals. One such waste stream requiring disposal is cladding-removal waste from nuclear reactors. This waste stream is generated during removal of the protective cladding on spent nuclear fuel rods.

The dry-solid compositions used to formulate grout materials in accordance with the present invention include cement, fly ash, clay and calcium hydroxide. The calcium hydroxide in the dry-solid blend neutralizes fluoride ions in the waste stream thereby allowing the grout to set. Other materials may be incorporated into the dry-solid materials of the present invention as well. The incorporation of additional materials into the dry-solid mixture is dictated by the specific application to which the grout formulation is directed. The presence of certain unusual compounds in aqueous waste material may necessitate the incorporation of additional compounds into the dry-solid material.

The dry-solid mixture generally includes from about 30 to about 70 weight percent cement, and more preferably includes from about 50 to about 70 weight percent cement. Various cements are useful in the invention. The most preferred cements are the Portland-type cements such as Type I Portland cement, Type II Portland cement and Type III Portland cement. As appreciated by those of ordinary skill in the art, the particular type of Portland cement to be used in the dry-solid mixture is selected in order to obtain specific properties in the grout materials.

The dry-solid mixture also contains from about 10 to about 60 weight percent fly ash, and more preferably from about 15 to about 40 weight percent fly ash. The fly ash is incorporated into the grout material as a filler to reduce the amount of cement in the grout. One reason for this substitution is that fly ash is significantly less expensive than cement. Moreover, as the amount of fly ash in the dry-solid formulation is increased, there is a corresponding increase in the compressive strength of the resulting grout material. A high compressive strength is a desirable property of grout material since it will make the grout more resistant to compressive forces and thereby reduce the amount of material which leaches out of the grout as a result of compressive forces. The preferred type of fly ash to be incorporated in the grout of the invention is Centralia, Wash. Class F fly ash. Other types of fly ash may also be used depending on their cost and availability.

The dry-solid mixture of the invention also includes from about 3 to about 13 weight percent clay, and more preferably from about 6 to about 10 weight percent clay. The clay is present in the dry-solid material primarily for the purpose of providing an ion-exchange medium. The preferred clay for use with the invention is illitic clay which has the general formula $(OH)_4K_x.(Al_4.Fe_4.Mg_4.\ Mg_6)Si_{8-x}.Al_x)O_{20}$. Other ion exchange clays may also be used in the invention.

Finally, the dry-solid material of the invention includes from about 5 to about 20 weight percent of calcium hydroxide, and more preferably from about 10 to about 14 weight percent calcium hydroxide. The calcium hydroxide is incorporated in the grout material in order to react with fluoride ions present in the waste material and produce insoluble calcium fluoride. The reaction between fluoride and calcium hydroxide takes place in the mixer and generates calcium fluoride and hydroxide ions. The calcium hydroxide is preferably added to the dry-solid blend as hydrated lime due to the inexpensive nature of this form of calcium hydroxide. However, other forms of calcium hydroxide such as reagent grade calcium hydroxide may be employed.

Attapulgite-150 clay, because of its apparent interference with the calcium hydroxide-fluoride reaction, is preferably not included in this grout formulation. However, it may be included in the grout formulations without seriously affecting the calcium hydroxide neutralization of fluoride ions. Attapulgite-150 clay is normally added to the dry-solid blend used in grout formulation to reduce the amount of drainable water which is generated by curing the grout material. Despite the absence of Attapulgite-150 clay from the preferred formulation, the grout produced by this method meets the criteria for drainable water and far exceeds the criteria for compressive strength of grouts. It also exhibits a very low viscosity, demonstrating good fluidity necessary for pumping the grout into the ground.

Fluoride-containing aqueous waste materials may be disposed of in accordance with the present invention. One such aqueous waste material is generated during removal of the protective cladding on spent nuclear fuel rods. Cladding-removal waste, which contains fluoride, cesium, ammonia and zirconium, must be chemically pretreated by the addition of an aqueous caustic solution, such as sodium hydroxide, before its immobilization in a cement based grout. The resulting slurry is further treated by adjusting the pH and the addition of sodium nitrite to meet storage tank specifications. The solids are allowed to settle and the supernate liquid is decanted for ultimate disposal as a separate waste stream. The resulting sludge, designated neutralized cladding-removal waste, becomes the waste feed stream to be immobilized in accordance with the present invention. The precipitation of zirconium by either direct strike or co-strike neutralization is a well established procedure. However, the neutralized cladding-removal waste differs from wastes previously fixed in grout in that it contains significant amounts of fluoride ions. The fluoride ions strongly retard the setting of cement-based grouts and thus can prevent the grout from obtaining an acceptable compressive strength and can cause excessive bleed water.

The neutralized cladding-removal waste is mixed with from about 6.0 to about 10.0 pounds of the dry-solid blend of the present invention per gallon of waste material. The mixing is accomplished in accordance with the procedures detailed by the American Society for Testing and Materials in 1984 *Annual Book of ASTM Standards,* Volume 04.02, Publication C192-81, "Standard Method of Making and Curing Concrete Test Specimens in the Laboratory", and Volume 04.01, Publication C305-82, "Standard Method for Mechanical Mixing of Hydraulic Cement Pastes and Waters of Plastic Consistency". After mixing, the grout is injected into the ground while it is still in a flowable condition. It is then allowed to cure in the ground and remain there.

The following examples are provided to illustrate the present invention.

EXAMPLE 1

TABLE 1

Dry-Solid Blend for Disposal of Neutralized Cladding Removal Waste (NCRW) with Calcium Hydroxide

| Material | wt % |
|---|---|
| Type III Portland Cement | 42.0 |
| ASTM Class F Centralia, WA, fly ash | 42.0 |
| Attapulgite-150 clay | 5.0 |
| Calcium Hydroxide | 10.0 |
| Barium Hydroxide | 1.0 |

The grouts made with the above dry-solid blend exhibited the following properties. All NCRW sludge includes fluorides.

TABLE 2

Parameters for grouts made with NCRW sludge mixed in the ratio of 6 lb/gal with dry-solids, (assumes no radioactive cesium).

| | Waste dilution (%) | | | |
|---|---|---|---|---|
| Parameter | 20 | 33 | 50 | 70 |
| Apparent viscosity (cP) | 93 | 52 | 30 | 21 |
| 10 M gel strength ($lb_f/100\ ft^2$) | 18 | 12 | 8 | 89 |
| Fluid consistency index, K' ($lb_f \cdot sec^{n'}/ft^2$) | 0.06 | 0.02 | 0.01 | 0.02 |
| Flow behavior index, n' | 0.45 | 0.52 | 0.56 | 0.42 |
| 28 days drainable water (vol %) | 4.48 | 6.16 | 0.0 | 0.0 |
| Density (lb/gal) | 12.81 | 12.59 | 12.28 | 11.90 |
| 28 days compressive strength (psi) | S | 23 ± 40 | 346 ± 2 | 300 |
| At reference conditions: | | | | |
| Critical velocity (gal/min) | 86 | 58 | 39 | 37 |
| Frictional pressure loss per 100 ft (psi) | 11.2 | 6.0 | 3.4 | 2.8 |

S — Material did not set-up, no test performed

Waste dilution % corresponds to the % water by volume in the waste formulation.

EXAMPLE 2

TABLE 3

Dry-Solid Blend for Disposal of Neutralized Cladding Removal Waste (NCRW) with Lime

| Material | Amount (wt %) |
|---|---|
| Portland cement, Type III | 57 |
| fly ash, class F, (Centralia, WA) | 25 |
| Indian Red pottery clay | 8 |
| Lime [$Ca(OH)_2$] | 10 |

The grouts made with the above dry-solid blend exhibited the following properties. All NCRW sludge includes fluorides.

TABLE 4

Effect of dry-solids blend variations on grout properties.

| Mix ratio (lb/gal) | 5 | 6 | 7 | 8 |
|---|---|---|---|---|
| Apparant viscosity (cP) | 14 | 21 | 34 | 55 |
| 10 min gel strength ($lb_f/100\ ft^2$) | 3 | 5 | 17 | >300 |
| Density (lb/gal) | 12.10 | 12.48 | 12.80 | 13.00 |
| Fluid consistency index (K') [$lb_f \cdot sec^{n'}/ft^2$] | 0.001 | 0.003 | 0.01 | 0.02 |
| Flow behavior index (n') | 0.84 | 0.70 | 0.59 | 0.53 |
| 28 day phase separation (vol %) | 24.92 | 17.84 | 0.0 | 0.0 |
| 24 hour penetration resistance (psi) | 0.0 | 0.0 | 280 | 530 |
| 7 day penetration resistance (psi) | 0.0 | 0.0 | 240 | 920 |
| 28 day penetration resistance (psi) | 0.0 | 0.0 | 2840 | 4800 |
| 28 day compressive strength (psi) | S | S | 629 ± 14 | 811 ± 18 |
| At reference conditions: | | | | |
| Reynolds number | 7430 | 4988 | 2726 | 1684 |
| Frictional pressure loss per 100 ft of pipe (psi) | 1.3 | 2.0 | 3.8 | 6.3 |
| Critical velocity (gal/min) | 17 | 26 | 42 | 58 |
| Pump head pressure (psi) | 0.5 | 0.8 | 2.8 | >50.0 |

S — material did not set-up, no test performed.

From this data it is apparent that grouts formulated with lime and no Attapulgite-150 clay exhibit the properties necessary for waste disposal in cement based materials.

It will be apparent to those of ordinary skill in the art that various modifications and variations of the invention can be made without departing from the scope or spirit of the invention. Accordingly, the scope of the invention shall be determined by the claims appended hereto.

What is claimed is:

1. A composition which may be used to formulate a waste disposal grout for immobilization of fluoride ion-containing aqueous waste materials comprising:

from about 30 to about 70 weight percent cement;

from about 10 to about 60 weight percent fly ash;

from about 3 to about 13 weight percent clay; and from about 5 to about 20 weight percent calcium hydroxide.

2. A composition in accordance with claim 1 wherein said clay comprises illitic clay.

3. A composition in accordance with claim 1 wherein said composition comprises:

from about 50 to about 70 weight percent cement;

from about 15 to about 40 weight percent fly ash;

from about 6 to about 10 weight percent illitic clay; and from about 10 to about 14 weight percent calcium hydroxide.

4. A composition in accordance with claim 1 wherein said calcium hydroxide comprises hydrated lime.

5. A composition in accordance with claim 4 wherein said composition is a dry-solid blend.

6. A method for the immobilization of fluoride ion containing waste in cement-based materials comprising the steps of:

mixing an aqueous waste material containing fluoride ions with from about 6.0 to about 10.0 pounds of a dry-solid material per gallon of said waste material, said dry-solid material comprising from about 30 to about 70 weight percent cement, from about 10 to about 60 weight percent fly ash, from about 3 to about 13 weight percent clay, and from about 5 to about 20 weight percent calcium hydroxide; and curing said mixture to produce a solid cement-based material.

7. A method in accordance with claim 6 wherein said clay comprises illitic clay.

8. A method in accordance with claim 7 wherein said dry solid material comprises:

from about 50 to about 70 weight percent cement;

from about 15 to about 40 weight percent fly ash;

from about 6 to about 10 weight percent illitic clay; and from about 10 to about 14 weight percent calcium hydroxide.

9. A method in accordance with claim 8 wherein said calcium hydroxide comprises hydrated lime.

* * * * *